US012471728B2

(12) United States Patent
Mainetti

(10) Patent No.: US 12,471,728 B2
(45) Date of Patent: Nov. 18, 2025

(54) TUBULAR ELEMENT OF CELLULOSE OR PAPER MATERIAL FOR MAKING HANGERS, PROCESS FOR MAKING THE SAME AND HANGERS USING SAID TUBULAR ELEMENT

(71) Applicant: MAINETTI S.P.A, Castelgomberto Vicenza (IT)

(72) Inventor: Mario Mainetti, Valdagno Vicenza (IT)

(73) Assignee: MAINETTI S.P.A., Castelgomberto Vicenza (IT)

(*) Notice: Subject to any disclaimer, the term of this patent is extended or adjusted under 35 U.S.C. 154(b) by 2 days.

(21) Appl. No.: 18/553,935

(22) PCT Filed: Apr. 1, 2022

(86) PCT No.: PCT/EP2022/058800
§ 371 (c)(1),
(2) Date: Oct. 4, 2023

(87) PCT Pub. No.: WO2022/214405
PCT Pub. Date: Oct. 13, 2022

(65) Prior Publication Data

US 2024/0188741 A1 Jun. 13, 2024

(30) Foreign Application Priority Data

Apr. 9, 2021 (IT) ........................ 102021000008906

(51) Int. Cl.
*A47G 25/36* (2006.01)
*A47G 25/48* (2006.01)
*B31C 5/00* (2006.01)

(52) U.S. Cl.
CPC ............ *A47G 25/36* (2013.01); *A47G 25/48* (2013.01); *A47G 25/483* (2013.01); *B31C 5/00* (2013.01)

(58) Field of Classification Search
CPC ......... A47G 25/36; A47G 25/38; A47G 25/48
See application file for complete search history.

(56) References Cited

U.S. PATENT DOCUMENTS 2,025,887 A 12/1935 Oldham
2,052,085 A * 8/1936 De Waide ............. A47G 25/38 223/88

(Continued)

FOREIGN PATENT DOCUMENTS

CN 212234053 12/2020
GB 2162866 2/1986

(Continued)

*Primary Examiner* — Shaun R Hurley
(74) *Attorney, Agent, or Firm* — DUANE MORRIS, LLP; Gregory M. Lefkowitz

(57) ABSTRACT

It is tubular element of cellulose or paper material for making hangers, having a cylindrical conformation, with a cross section perpendicular to its longitudinal axis of a substantially circular shape, from the surface of which a flat element integral with the tubular element and extending over the entire longitudinal length of said tubular element is radially projected outwardly. Said element provides that at its surface opposite to that in which the flat element is present at least one opening within which an accessory element is insertable and it provides, at the end of the tubular element, rods insertable in suitable holes present on the surface of the tubular element opposite to the surface in which the flat element is present, said rods being adapted to prevent the outward disengagement of clamps hooked to said tubular element.

6 Claims, 20 Drawing Sheets

(56) References Cited

U.S. PATENT DOCUMENTS

| | | | | | |
|---|---|---|---|---|---|
| 2,089,077 | A * | 8/1937 | Todd | A47G 25/26 | 223/98 |
| 2,091,992 | A * | 9/1937 | Johnson | A47G 25/38 | 223/88 |
| 2,095,618 | A * | 10/1937 | Schwartzman | A47G 25/26 | 223/98 |
| 2,214,849 | A * | 9/1940 | Young | A47G 25/38 | 248/58 |
| 2,314,643 | A * | 3/1943 | Young | A47G 25/38 | D6/318 |
| 2,334,370 | A * | 11/1943 | Young | A47G 25/38 | 223/88 |
| 2,368,348 | A * | 1/1945 | Coney | A47G 25/38 | 223/88 |
| 2,375,161 | A * | 5/1945 | Young | A47G 25/36 | 223/92 |
| 2,392,022 | A * | 1/1946 | Young | A47G 25/38 | 223/88 |
| 2,460,939 | A * | 2/1949 | Ludwig | A47G 25/36 | 493/308 |
| 2,503,829 | A * | 4/1950 | Ludwig | A47G 25/38 | 223/92 |
| 2,510,044 | A * | 5/1950 | Tillery | A47G 25/26 | 223/88 |
| 2,585,715 | A * | 2/1952 | Knowles | A47G 25/26 | 223/98 |
| 2,607,516 | A * | 8/1952 | Heilman | A47G 25/38 | 223/95 |
| 2,641,391 | A | 6/1953 | Tillery | | |
| 2,641,393 | A | 6/1953 | Gwinn | | |
| 2,786,618 | A * | 3/1957 | Emmerling | A47G 25/26 | 223/98 |
| 3,353,727 | A * | 11/1967 | Tillery | A47G 25/36 | 223/88 |
| 2014/0076939 | A1 * | 3/2014 | Choi | A47G 25/36 | 223/85 |
| 2021/0037999 | A1 | 2/2021 | Salomaki et al. | | |

FOREIGN PATENT DOCUMENTS

| | | | | |
|---|---|---|---|---|
| GB | 2461998 | A * | 1/2010 | A47G 25/36 |
| JP | S5583049 | | 6/1980 | |
| KR | 200452351 | | 2/2011 | |

* cited by examiner

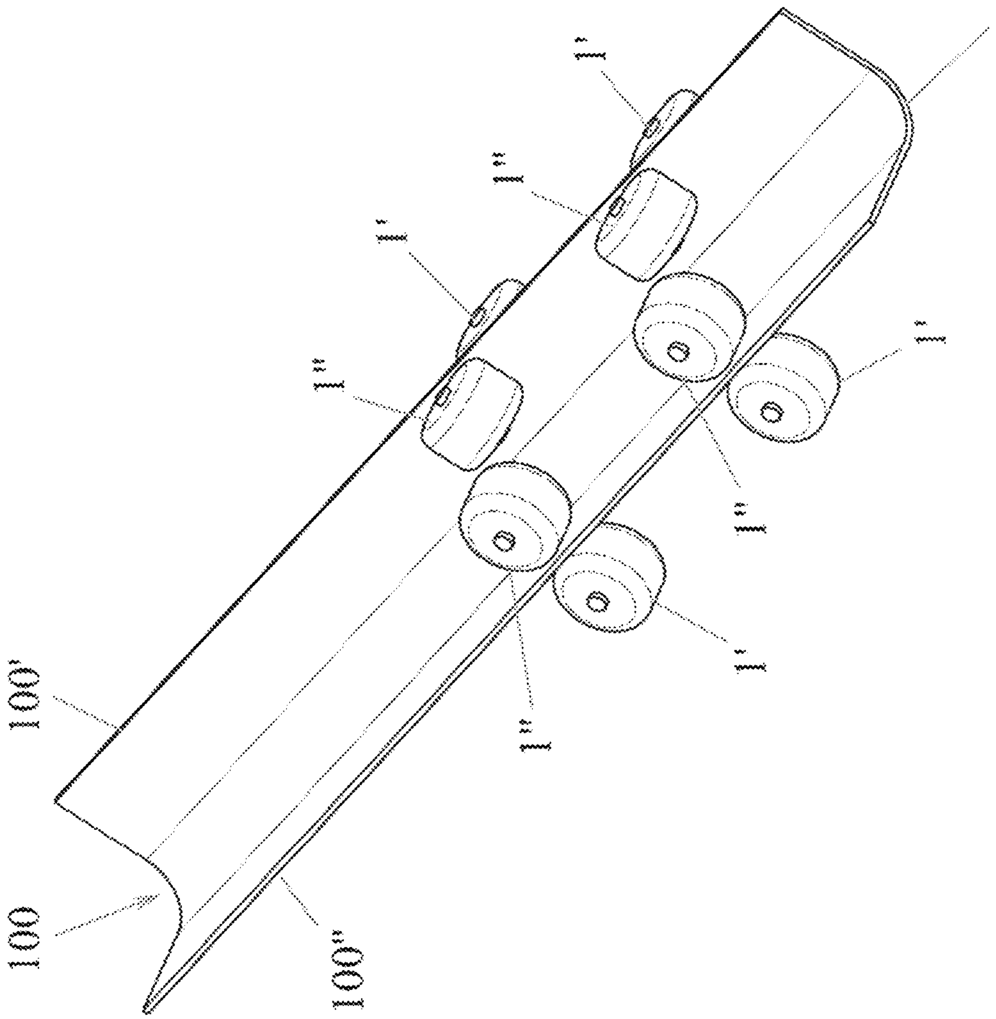
Fig. 2
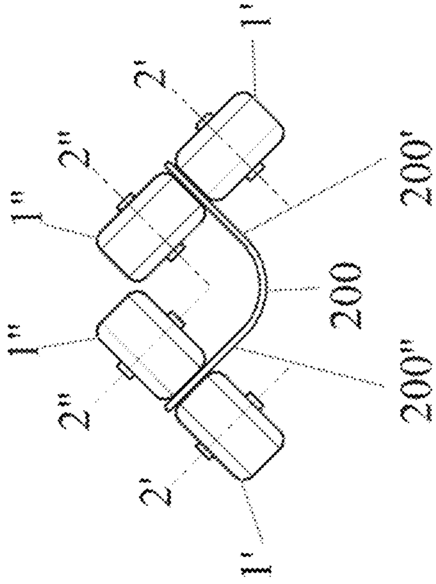
Fig. 2bis

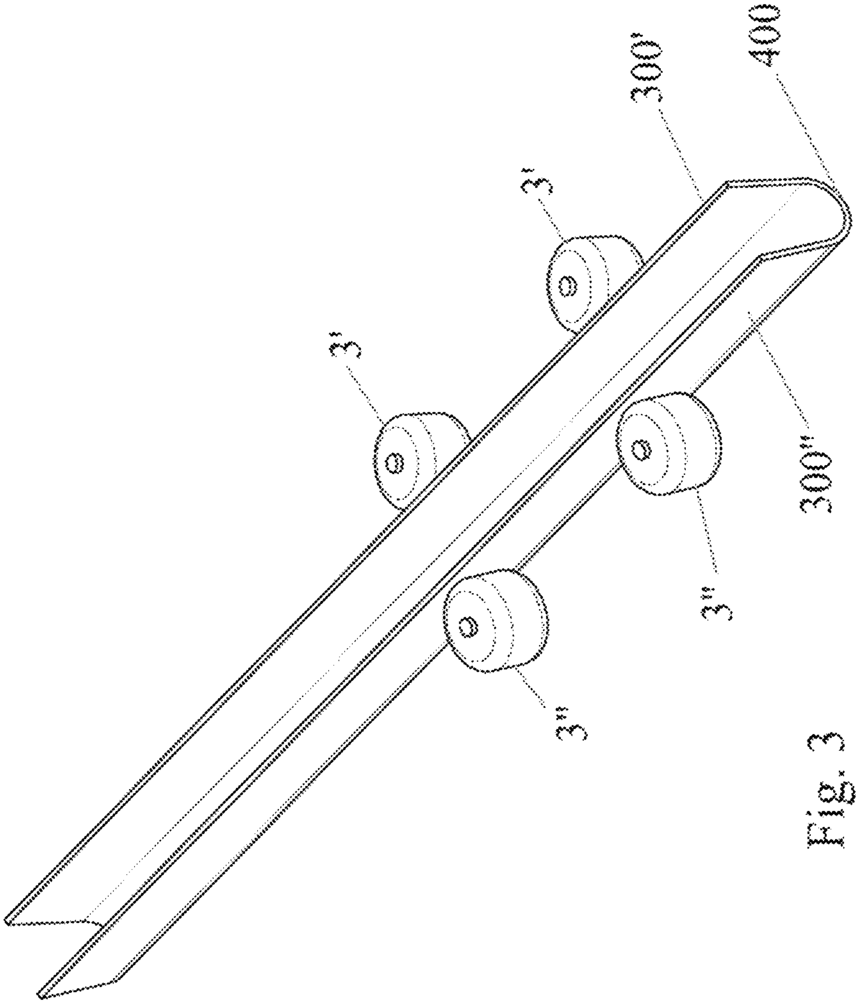
Fig. 3
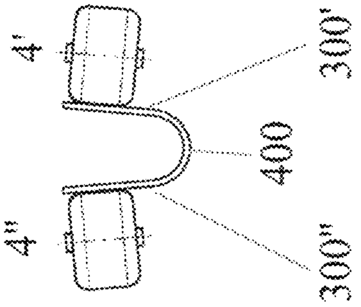
Fig. 3bis

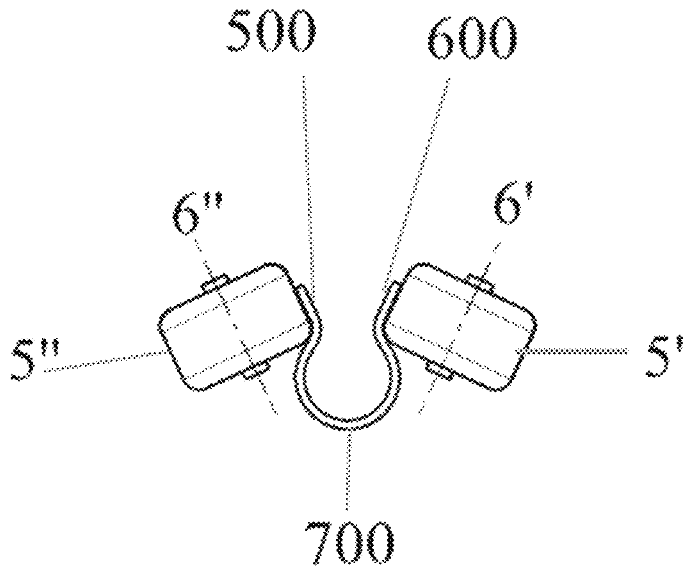
Fig. 4bis

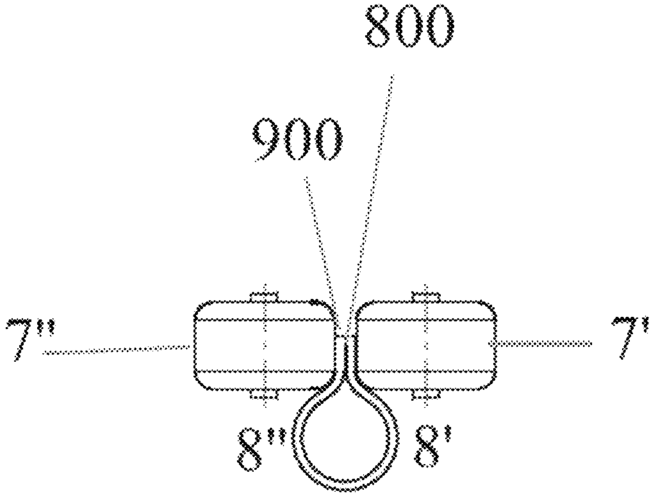
Fig. 5bis

TUBULAR ELEMENT OF CELLULOSE OR PAPER MATERIAL FOR MAKING HANGERS, PROCESS FOR MAKING THE SAME AND HANGERS USING SAID TUBULAR ELEMENT

CROSS-REFERENCE TO RELATED APPLICATIONS

This application is a § 371 national stage entry of International Application No. PCT/EP2022/058800, filed Apr. 1, 2022, which claims priority to Italian Application No. 102021000008906, filed Apr. 9, 2021, the entire contents of which are incorporated herein by reference.

The present invention relates to a tubular element of cellulose or paper material for making hangers. The present invention also relates to a process for making said tubular element of cellulose or paper material for making hangers, as well as hangers using said tubular element.

In recent years, a strong ecological trend has emerged in the field of clothes hangers, which is pushing for the abandonment of traditional plastic materials in favour of more easily recyclable and environmentally friendly materials.

Several hangers are known in the art, made starting from cellulose pulp or paper material suitably shaped to give it the typical shape of a classic hanger with shoulders and mainly dedicated to garments such as coats, jackets, jumpers or shins.

An example of this type of hanger can be seen in the international publication WO2021/228693 A1, owned by the applicant of the present patent, which discloses a hanger obtained from cellulose pulp, which has been subjected to several steps in order to shape it in a simple and effective manner, obtaining the shoulders necessary for storing the aforesaid clothes.

It is clear that this type of hanger does not require a tubular element to perform the required function, as the function of supporting the garments is performed by the shoulders of the hanger, however, this element is required in hangers dedicated to garments such as trousers and skins, which do not have shoulders and have two possible configurations:

- two parallel elements am connected together by two C-shaped sections, so as to create a slot that allows to accommodate the garments astride its lower element; the hook of the hanger is preferably placed at the midpoint of the upper element. This configuration, with the use of the tubular element referred to in the invention, is shown in FIGS. 16-19;
- one element has the hanger hook at its midpoint and clamps at its ends provided with clips that allow the garments to be hung by retaining them. This configuration, with the use of the tubular element referred to in the invention, is shown in FIG. 7.

Currently, the tubular elements made of cellulose or paper material are made starting from strips wound spirally around themselves, using materials glued between the turns to give solidity to the structure. However, the element thus obtained does not yet have a sufficiently high moment of inertia to withstand the typical stresses of the hangers. If forces generated by hanging garments were applied to a tubular element made in this way, it would flex excessively and the turns would tend to detach.

The document U.S. Pat. No. 2,025,887 A describes (the following references relate to this document) a tubular element of cellulose or paper material (p. 2, col. 1, line 40)

for making hangers (FIG. 1), having a cylindrical conformation, with a cross section perpendicular to its longitudinal axis of a substantially circular shape (FIG. 5), from which surface a flat element (FIG. 5, element 13), integral with the tubular element and extending over the entire longitudinal length (FIGS. 1, 2) of said tubular element, is radially projected outwardly (FIG. 5).

The document US 2021/037999 A1 shows (the following references relate to this document) a process (FIGS. 7-8*b*) for making a tubular element of cellulose or paper material for making hangers, which provides for advancing a continuous strip of cellulose or paper material in general (FIGS. 7-8*b* element 7) by means of a series of stations comprising rollers and/or guiding devices (FIGS. 7-8*b* elements 9, 10, 11) arranged along the direction of advancement of said strip and acting at different portions of its opposed sides, each station being suitably positioned and angled with respect to the strip in order to progressively give it a cylindrical shape which is closed by means of a flat element (FIGS. 5, 6 element 4, par. 38) constituted by the edges of the strip abutted to each other.

In addition, reference is also made to document KR 200452351 Y1 in which a hanger (FIGS. 5, 6) is shown (the following references elate to this document), which has a pair of elements (FIG. 5, elements 320, 200) which am mutually parallel and mutually connected by a pair of elements (FIGS. 5, 6, element 310) arranged at the ends of aid elements, with a hook (FIGS. 5, 6, element 100) arranged on the upper element, said hanger being adapted to support garments placed on its lower element.

Other state-of-the-art documents to be cited are U.S. Pat. Nos. 2,641,393 A, 2,641,391 A, GB 2162886 A. CN 212234053 U and JP S5583049 U7.

Object of the present invention is to make a tubular element made of cellulose or paper material capable of withstanding the typical stresses present in the hangers.

This object is achieved by means of a tubular element obtained starting from a continuous strip shaped to obtain a cylindrical shape from the surface of which a flat element is radially projected outwardly.

Another object of the present invention is to provide a process for obtaining the aforesaid tubular element for hangers, providing for the use of a series of rollers and/or guiding devices suitably positioned to obtain the desired shape starting from a continuous strip.

It should be noted that prior to the process referred to in the invention, the continuous strip of cellulose or paper material can be moistened before being deformed by the roller stations and/or guiding devices to facilitate subsequent forming thereof.

Similarly, before being deformed by the roller stations and/or guiding devices, the continuous strip of cellulose or paper material can be heated to a temperature higher than the room temperature, again to facilitate subsequent forming thereof.

The invention will be better defined through the description of a possible embodiment thereof, given solely by way of non-limiting example, with the aid of the attached drawings, wherein:

FIG. 1 shows a perspective view of a particular embodiment of the tubular element according to the invention.

FIGS. 2 to 5 and 2*bis* to 5*bis* show various steps of the process according to the invention in order to obtain a tubular element with the desired shape:

Figure 1:
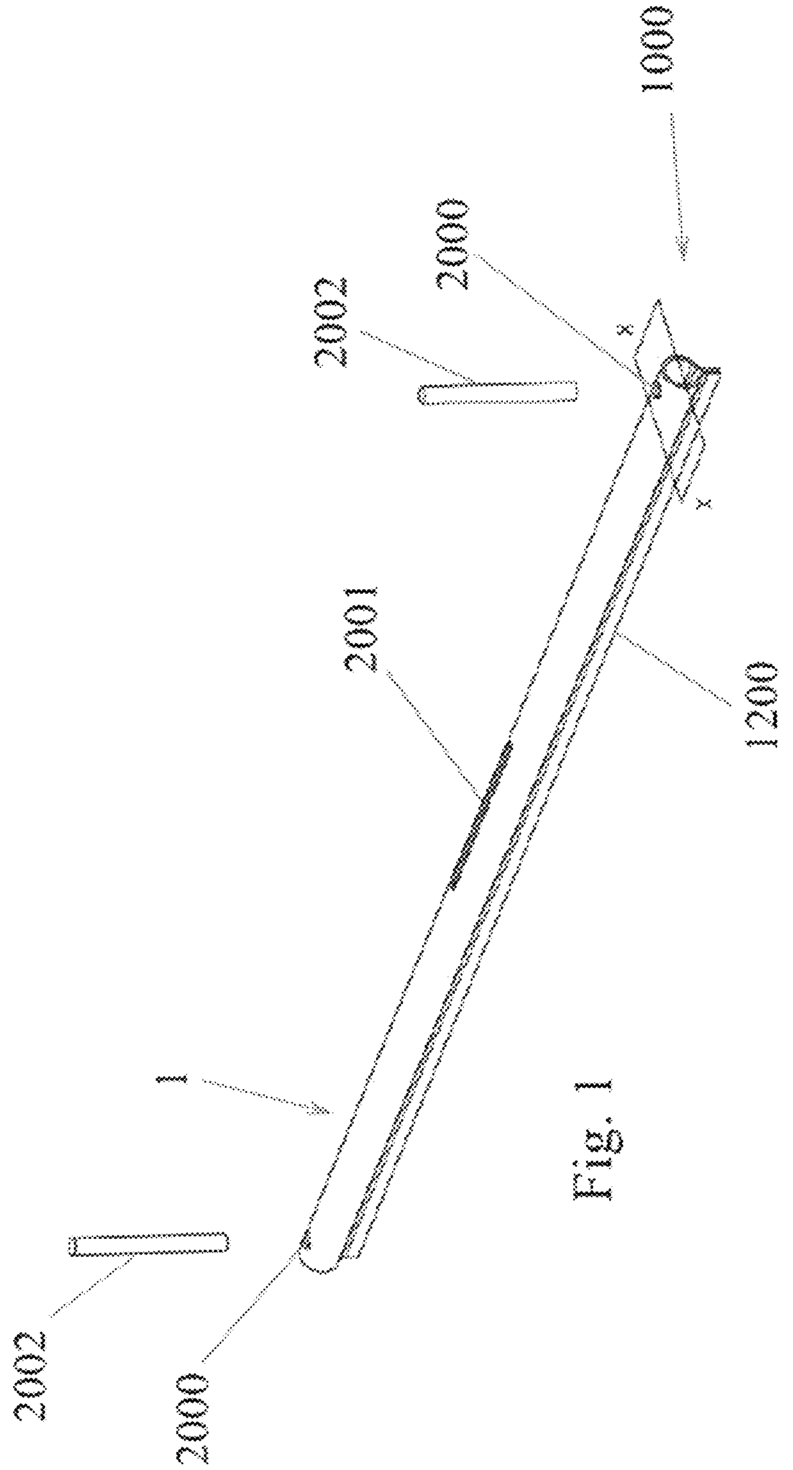
Figure 4:
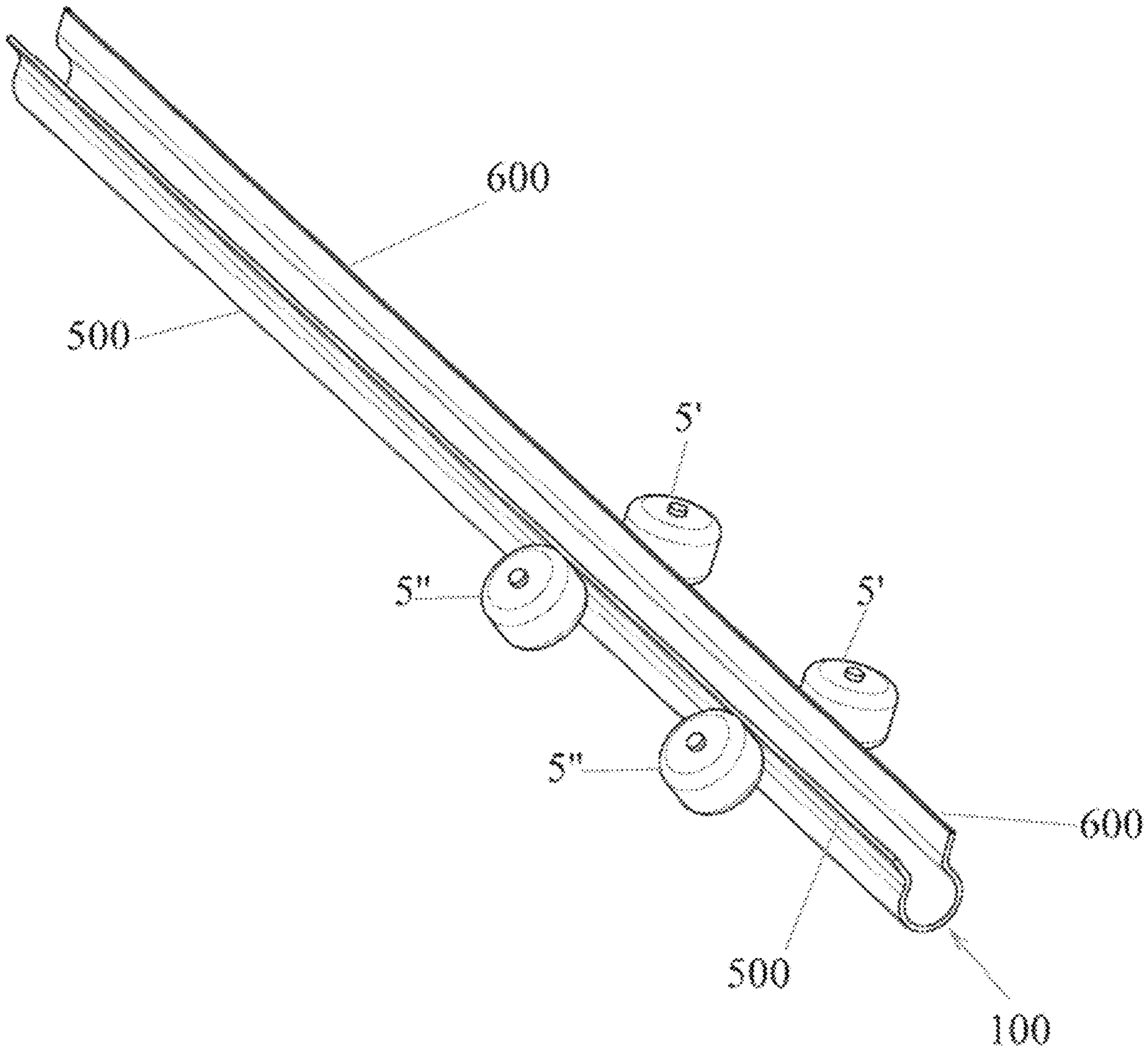
Figure 5:
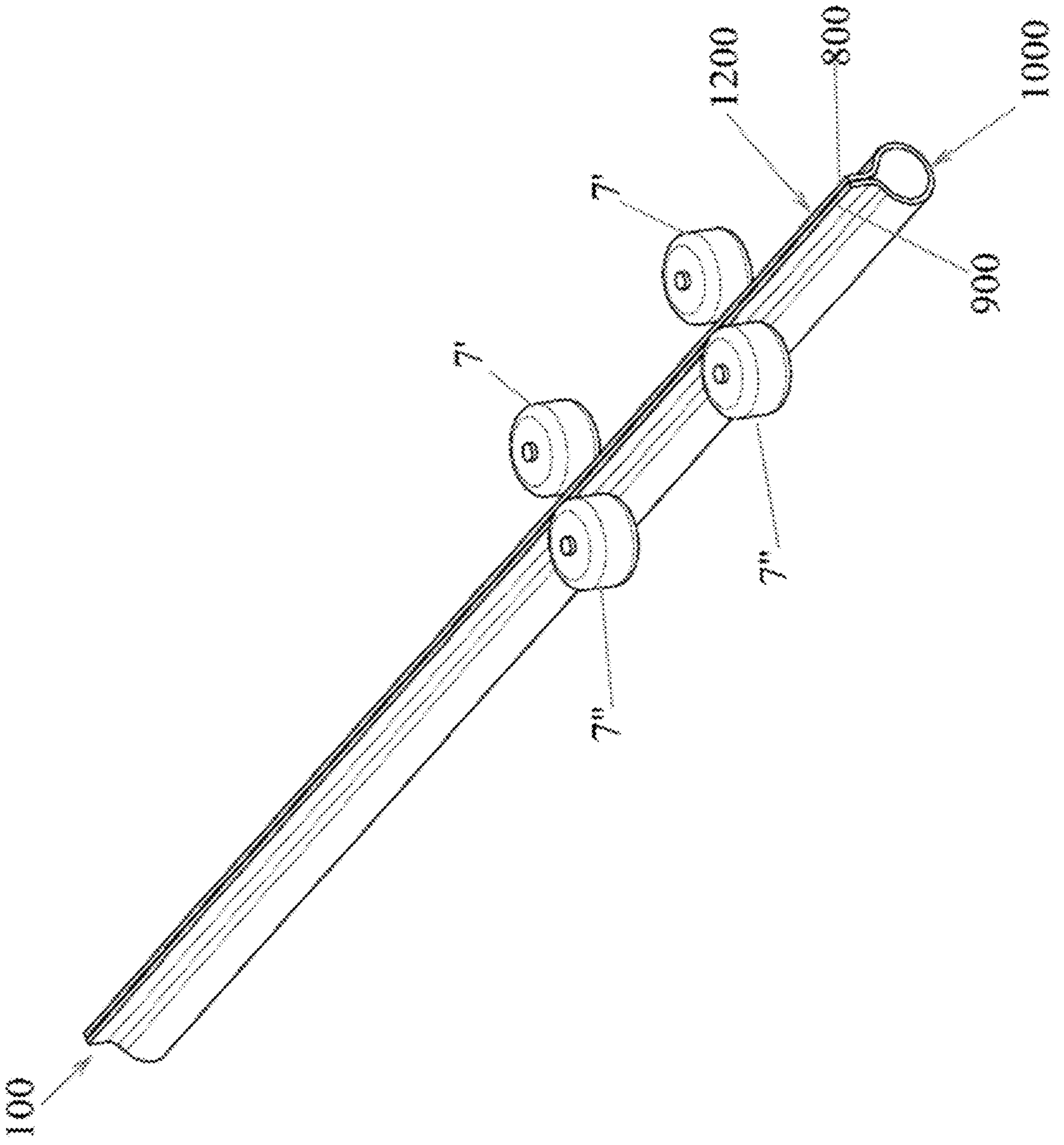
Figure 6:
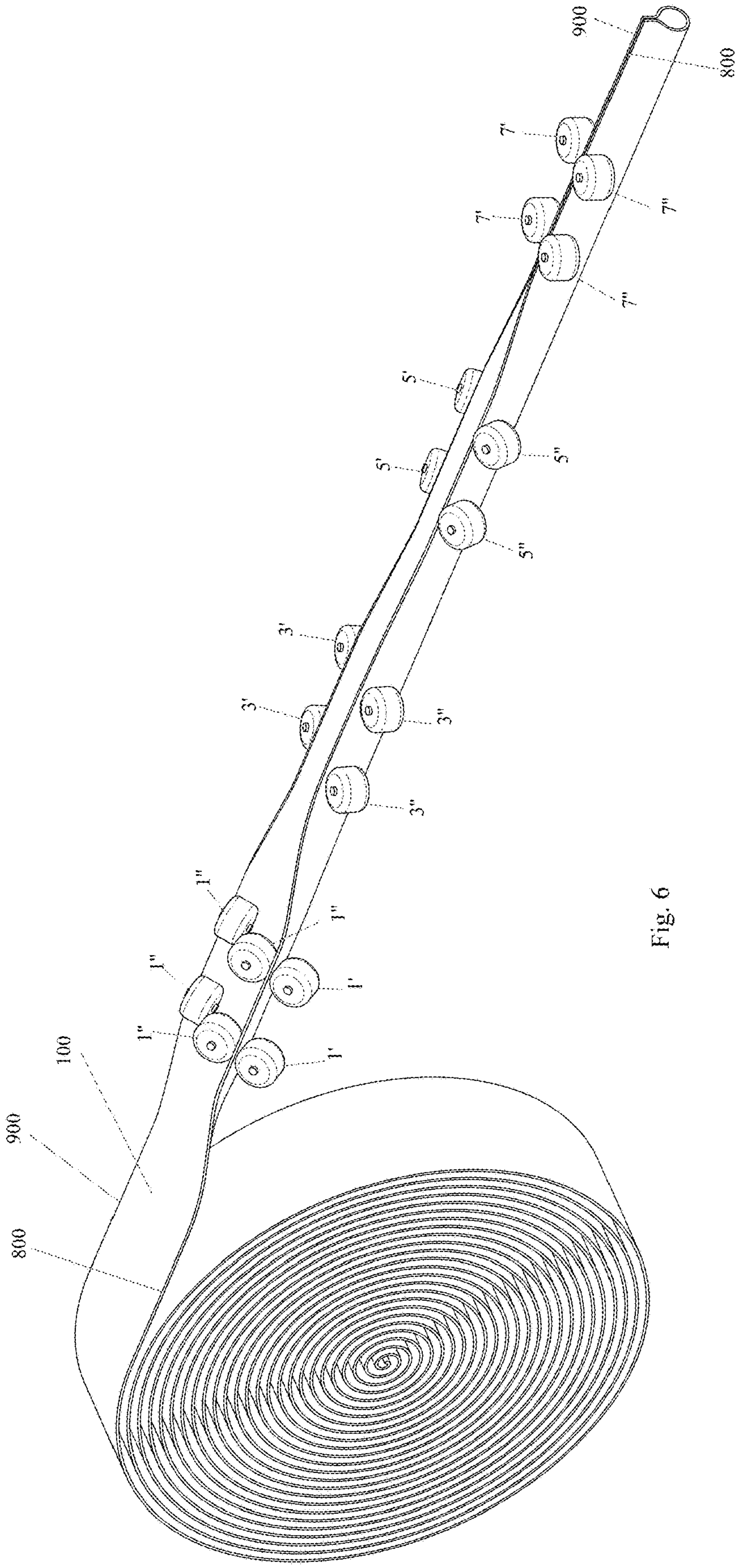
FIG. 6 shows a perspective view of an entire line adapted to carry out the process according to the invention.
Figure 7:
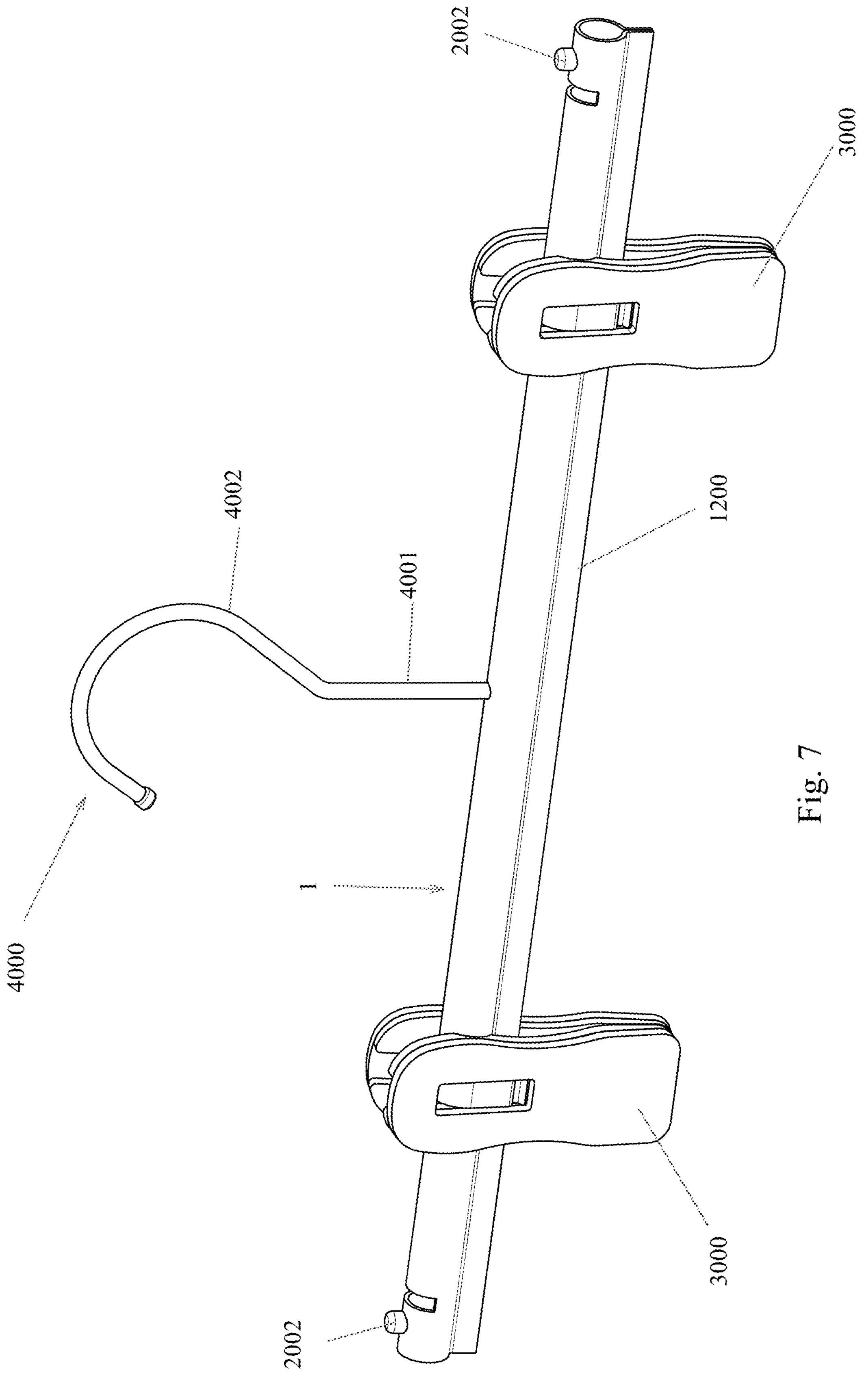
FIG. 7 shows a perspective view of a hanger using a tubular element according to the invention, comprising two clamps placed towards the ends of said tubular element, with particular means for retaining the clamps.

FIG. 1 shows a particular embodiment of the tubular element 1 referred to in the invention; in particular, a slit 2001 obtained at the upper central part of the tubular element 1, as well as, at the ends of said tubular element 1, holes 2000 in which rods 2002 are insertable, the use of which will be better specified later, are present. In fact, as better visible in FIG. 7, clamps 3000 adapted to hold the garments can be applied 1*o* to the tubular element 1, with methods per se known. The presence of the rods 2002, of which only the upper portion projecting from the hanger is visible, having already been inserted in the holes 2000, serves precisely to prevent the removal of the clamps 3000 from the tubular element 1. FIG. 1 also shows the rods 2002 not yet inserted in the holes 2000.

From FIGS. 2 to 6 it is visible how the tubular element according to the invention is obtainable starting from a continuous strip 100 of cellulose or paper material, which is being advanced by means of a series of roller stations, which act at different portions of the opposed sides of the strip 100 to progressively shape it, giving it a cylindrical shape with a cross section perpendicular to its longitudinal axis, with a substantially circular shape, from the surface of which a flat element 1200 is radially projected outwardly, constituted by the edges 800, 900 of the strip 100 which are pressed together by means of one of said roller stations. In order to obtain a more solid closure, it is advantageously provided for the use of adhesive materials on the surfaces of said edges 800, 900 that come into contact. The rollers, for this purpose, are suitably angled and positioned with respect to the strip 100, so as to act on it progressively, allowing it to gradually adapt to the shaping, thus avoiding breaking it, not subjecting it to sudden tensions.

It should be noted, however, that the roller stations may be replaced by other guiding devices adapted to perform the same function, such as elements advantageously made of sheet, metal that progressively shape the strip 100.

In a particular example of the process according to the invention, the tubular element 1 is obtained by the following steps (FIGS. 2 to 5 and 2*bis* to 5*bis*):

- dragging the strip 100 by means of a structure comprising a plurality of pairs of rollers 1'. 1" arranged with axes 2', 2" that are reciprocally parallel, between which the lateral edges 100'. 100" of the strip 100 are interposed, it being provided that the rollers 1', 1" placed at the opposite sides of the strip 100 have axes 2'. 2" mutually inclined substantially by 90°, so as to determine the curvature of the strip so that the same assumes, in cross section, the conformation of a right angle, with the edges 100'. 100" connected by a curved section 200:
- dragging the strip 100 by means of a structure comprising a plurality of pairs of rollers 3'. 3", each of which arranged at one of the edges 300'. 300" opposite to the strip 100, said rollers 3', 3" being arranged with axes 4', 4" that are substantially parallel, so as to make the strip 100 assume a substantially U-shaped conformation, with substantially parallel edges 300', 300", mutually connected by a curved section 400;
- dragging the strip 100 by means of a structure comprising a plurality of pairs of rollers 5'. 5" arranged with mutually inclined axes 6'. 6", which acts on the edges 500, 600 of the strip 100 so that they are arranged in a mutually inclined manner as the axes 6'. 6" of the rollers 5'. 5" and are mutually connected by a loop structure 700;
- dragging the strip 100 by means of a structure comprising a plurality of pairs of rollers 7', 7", with axes 8', 8" that are reciprocally parallel and arranged in a close position, so as to compress the edges 800, 900 of the strip 100, causing them to mutually adhere, said strip 100 substantially assumes the shape of a tubular element with a substantially circular cross-section, from the surface of which a flat element 1200 obtained by the reciprocal adhesion of said two edges 800, 900 of the strip 100 is radially projected outwardly.

At the end of the process that allows obtaining the reciprocal adhesion of the edges 800 and 900, it is possible to provide for a step in which said edges are trimmed once joined; finally, it is possible to provide for a step in which a portion of finished length of the continuous strip 100 conformed to the tubular element 1 is cut.

The tubular element 1 thus obtained, thanks to the presence of the flat element 1200, has a moment of inertia, with respect to the bending plane XX of FIG. 1, greater than that of a simple hollow cylinder, thus guaranteeing an excellent resistance to the typical stresses for hangers; said bending plane XX is precisely the one with respect to which the hangers are subjected to stress when they are loaded by the weight of the garment they support.

Figure 8:
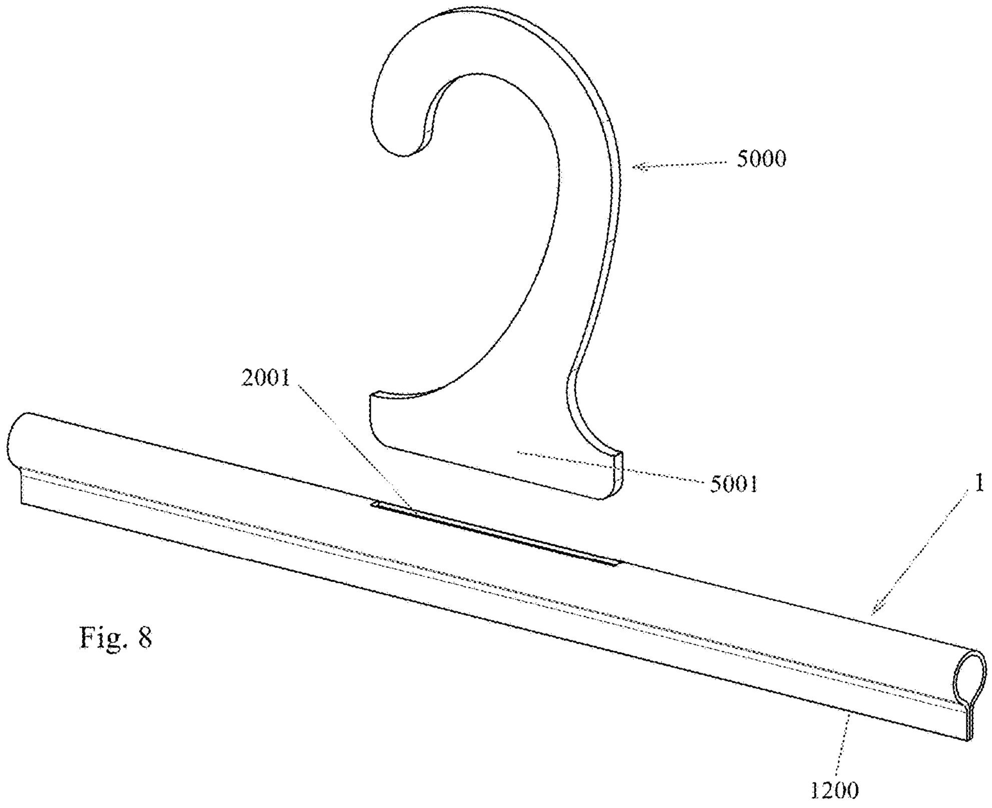
FIGS. 8 and 9 show respectively a perspective view and a vertical sectional view of a tubular element according to the invention, with a first particular hook with flat shape.
Figure 9:
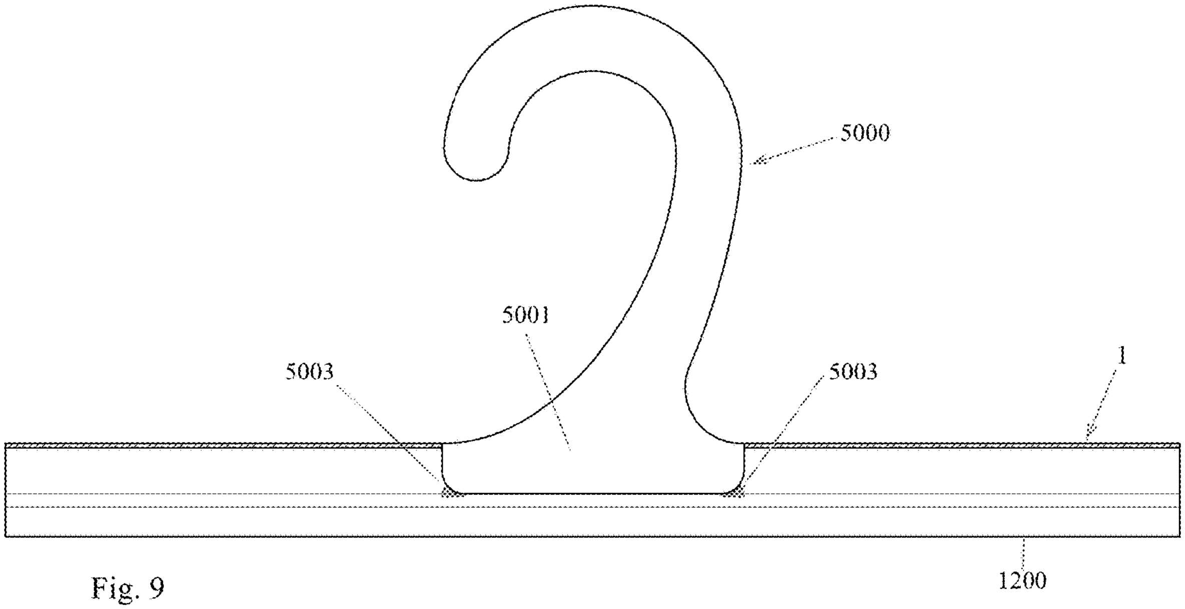
Figure 10:
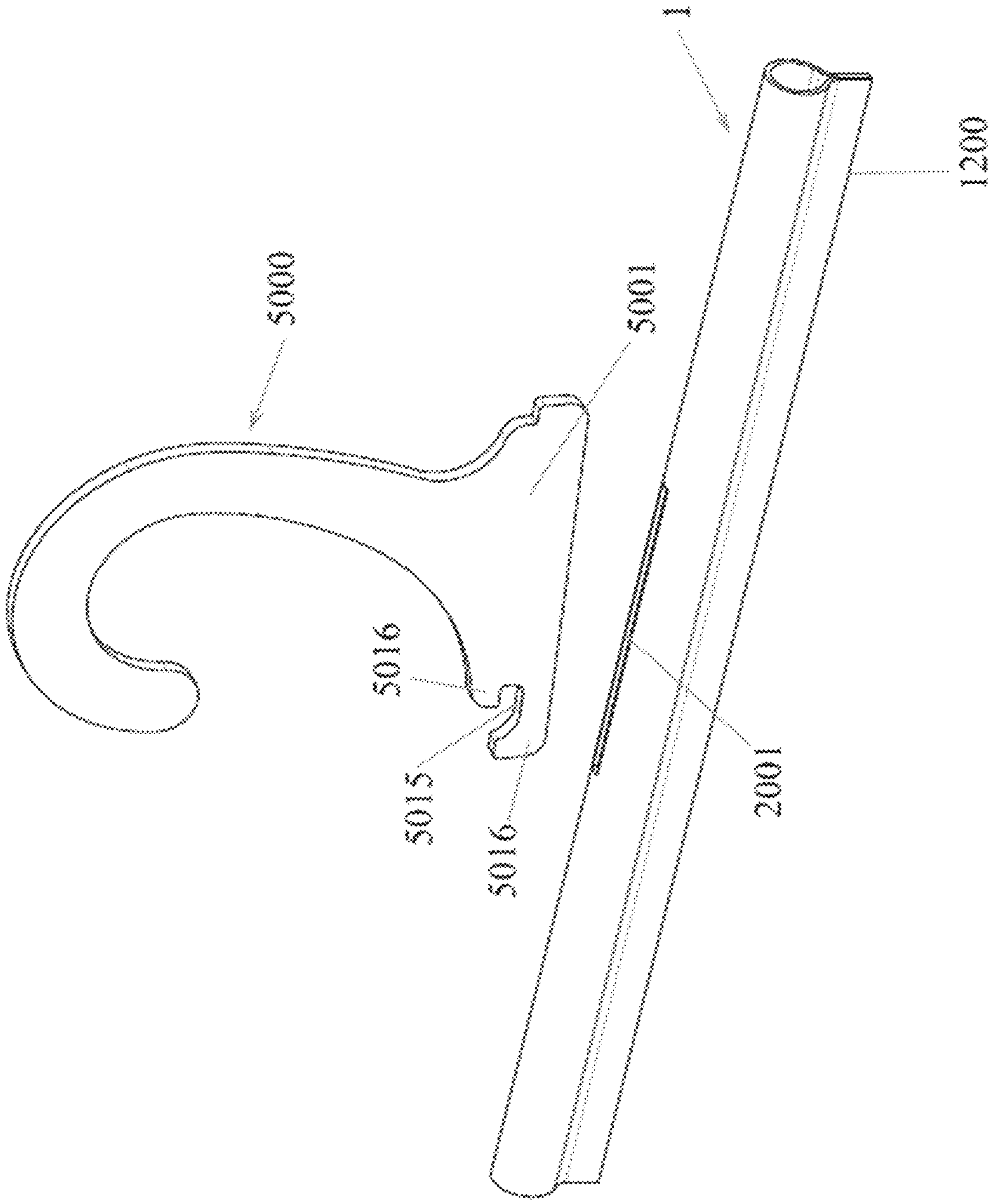
FIGS. 10-13 show views in perspective (FIG. 10) and in vertical section (FIGS. 11-13) respectively of a tubular element according to the invention, with a second particular hook with flat shape.
Figure 11:
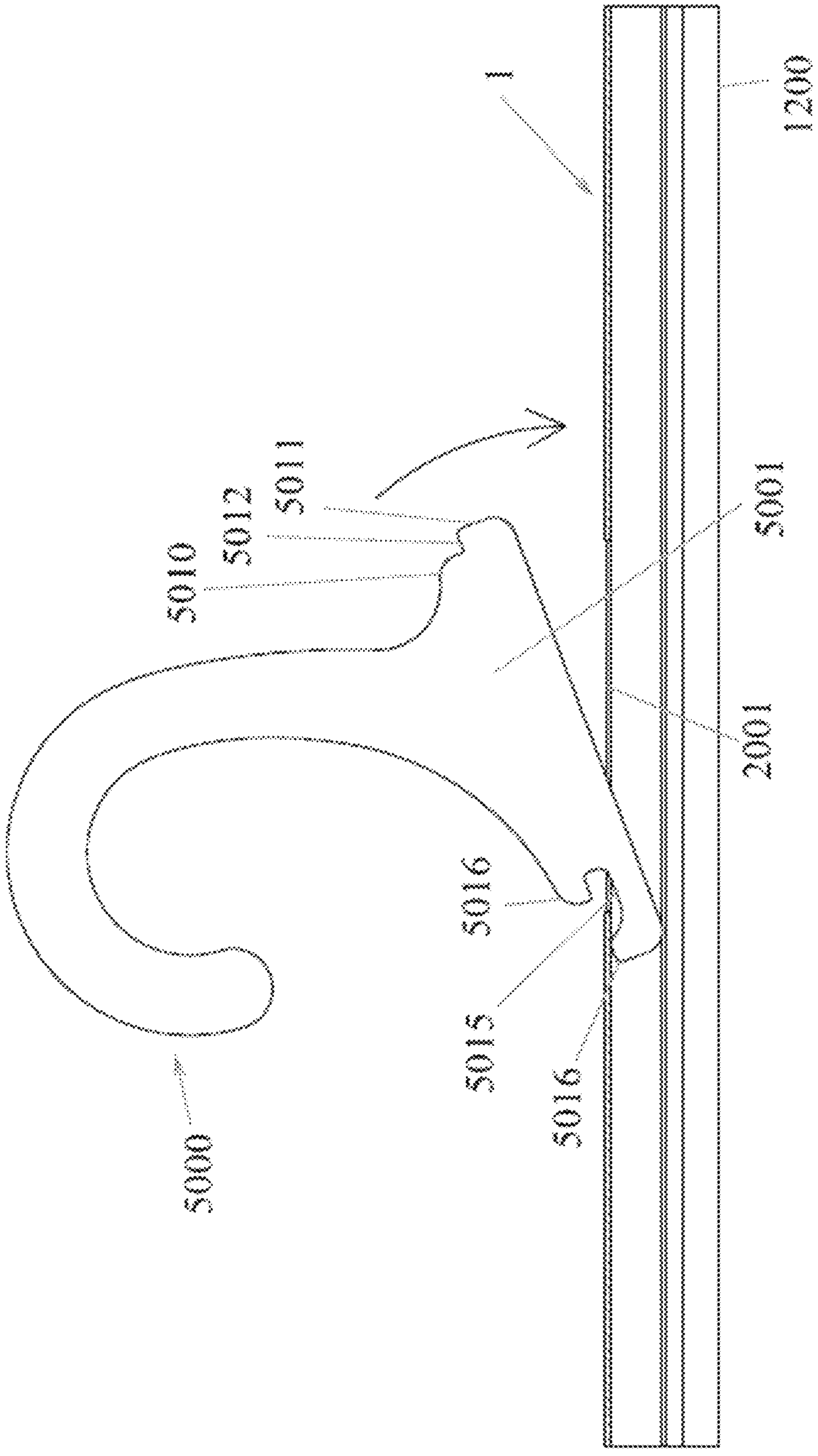
Figure 12:
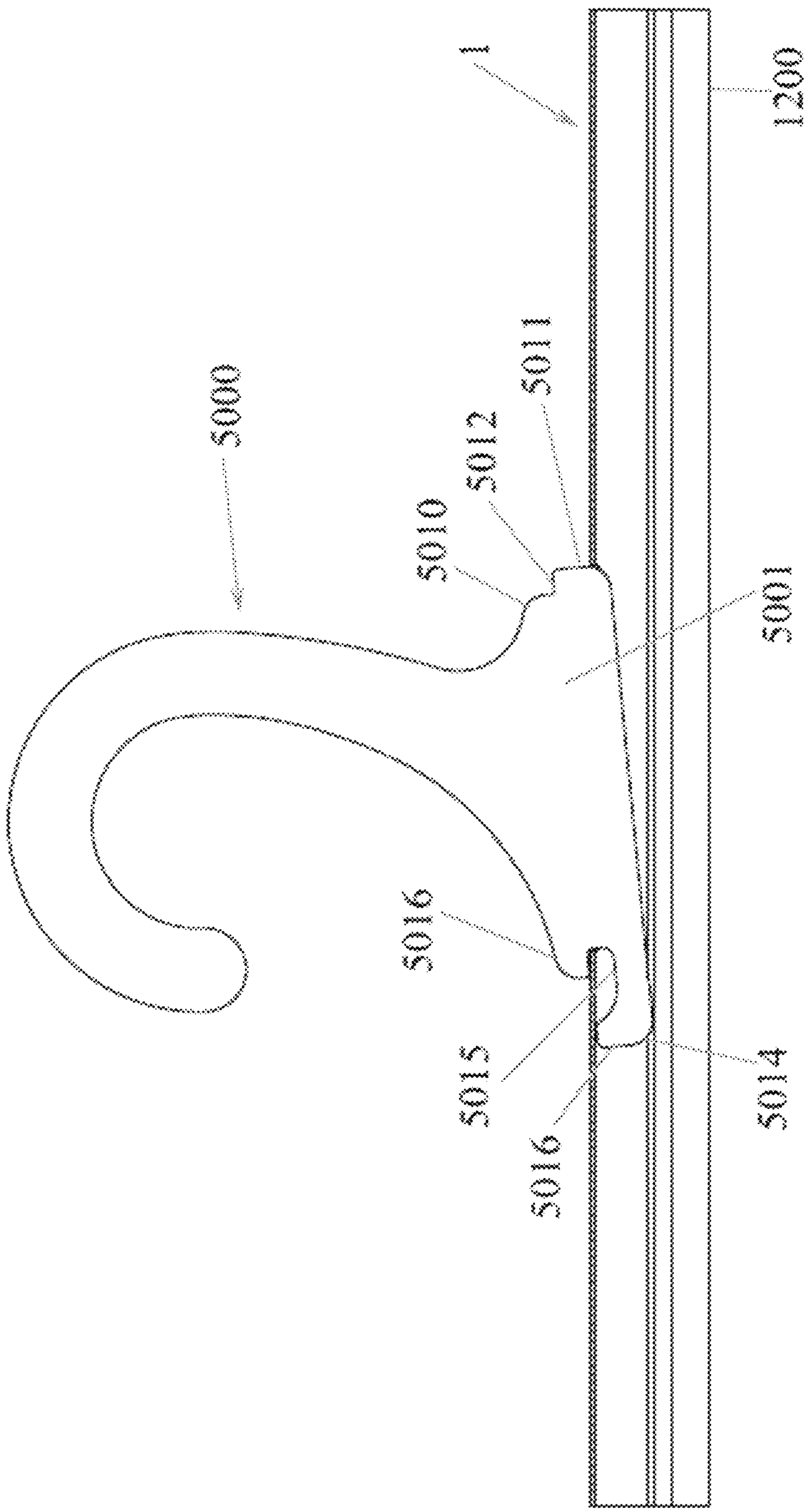
Figure 13:
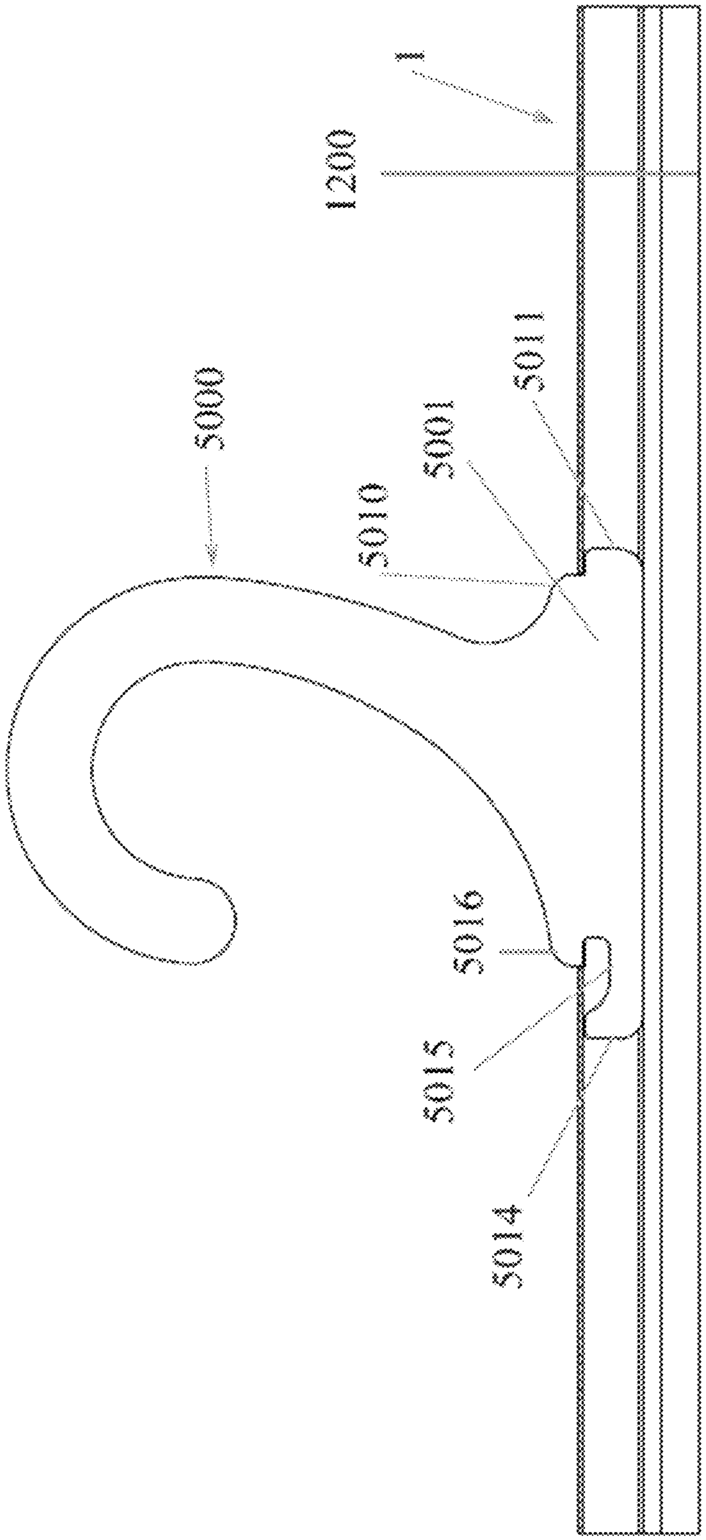

FIGS. 8 and 9 show that, according to another embodiment of use of the tubular element 1 according to the invention, a hook 5000 with flat shape is used, which has an elongated shank 5001, adapted to be inserted to measure inside a slit 2001 made at the upper part of the tubular element 1, opposite to the one at which the flat element 1200 is present. De facto, the slit 2001 and the shank 5001 have a substantially corresponding length. After having inserted said shank 5001 to measure into the slit 2001, said shank will be fixed mutually to the internal surface of the tubular element 1 by means of a special glue element 5003.

FIGS. 10 to 13 illustrate another embodiment of a hanger using the tubular element referred to in the invention, also with a hook 5000 with flat shape. The latter, like in the previous case, will advantageously be made of pressed cardboard or other similar easily recyclable material, in order to have to deal with a hanger made entirely of paper material.

Even in this case the hook 5000 has a shank 5001 adapted to be fitted into a slit 2001 present in the lower part thereof. In this case, however, at a first end thereof 5011, the shank 5001 has a recess 5010, due to the presence of which a step 5012 is formed above the end 5011 which precisely connects the end 5011 with said recess 5010. Vice versa, at the opposite end of the shank 5001 a concavity 5015 is present, delimited at the top by a nose 5016.

As visible from the sequence of FIGS. 10 to 13, in this case the shank 5001 has a greater overall length than that of the slit 2001, also in this case made at the upper surface of the tubular element 1, in a position opposed to that in which the flat 1, element 1200 is present. From an operational point of view, first of all (see FIG. 11) the shank 5001 is partially fitted into the slit 2001, making sure that one of the ends of the aforesaid will fit inside the concavity 5015; the hook is then further lowered, making sure that the nose 5016 (see FIG. 12) will place itself against the portion of the outer surface of the tubular element 1 adjacent to the end of the slit 2001. At the same time, the upper portion of the nose 5016 of the shank 5001 located at the end of the concavity 5015 is placed against the internal surface of the tubular element 1. Furthermore, as is visible in particular in FIGS. 12 and 13, the insertion of the opposite end 5011 of the shank 5001 into the slit 2001 is achieved, as long as the upper surface of the step 5012 is placed against the internal surface of the tubular element 1 placed near the end opposite to the previous one of the slit 2001.

In practice, the particular profiling of the shank 5001 is such as to guarantee the stable "snap" positioning of the hook 5000 by means of the slit 2001 inside the tubular element 1, ensuring an integral fixing of the hook 5000 with respect to the tubular element 1, all thanks to a certain elasticity and deformability of the material with which said hook 5000 is made.

It should be noted, however, that the shank may be shaped in a different manner from that illustrated and described above, provided that it can be inserted with a snap into the slit, it being understood that the aforesaid slit will still have an overall length shorter than the longitudinal length of the shank itself.

Figure 14:
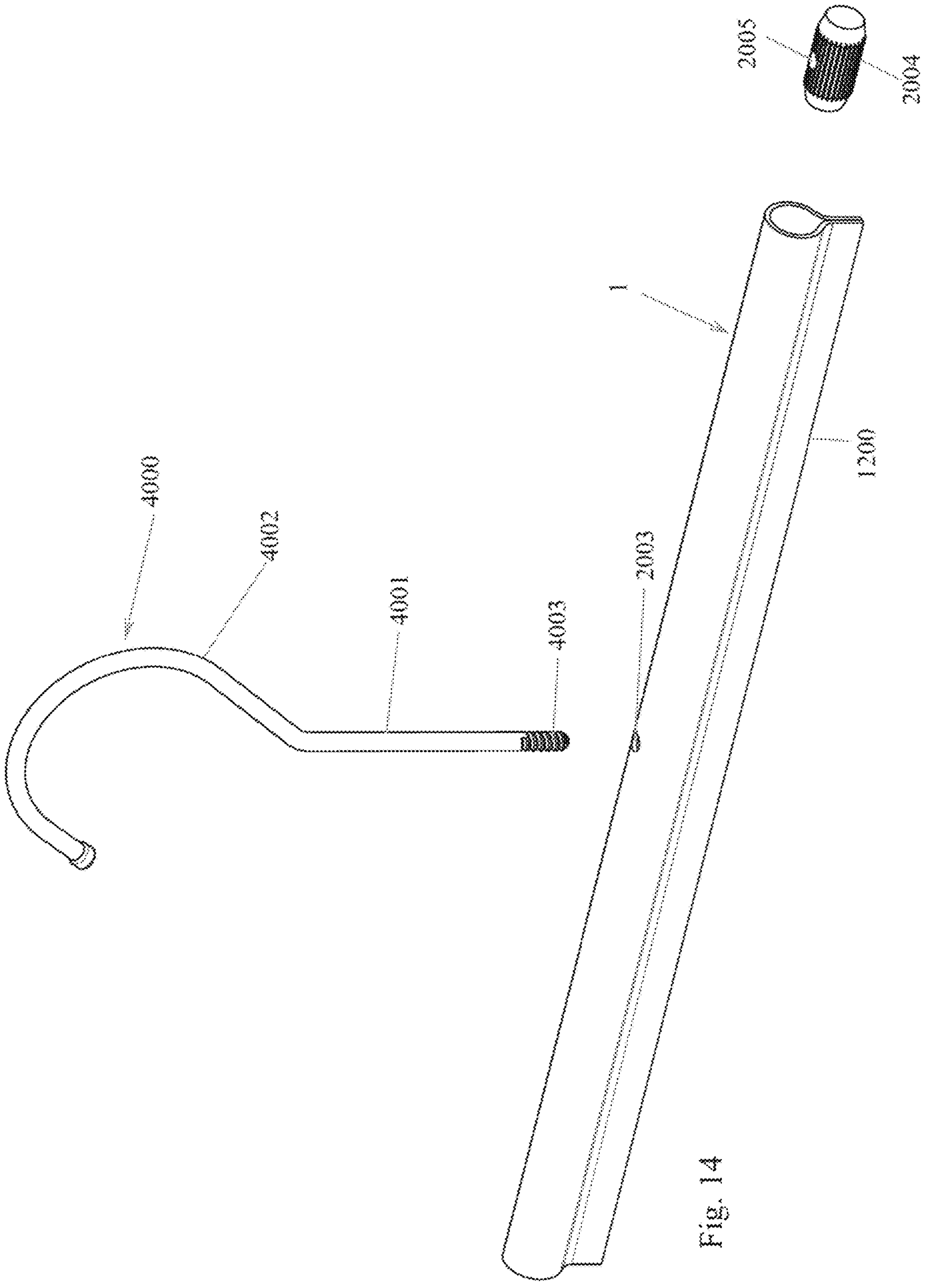
FIGS. 14 and 15 show, respectively, a perspective view and a vertical sectional view of a hanger using a tubular element according to the invention, with a hook that can be screwed to an element present within said tubular element.
Figure 15:
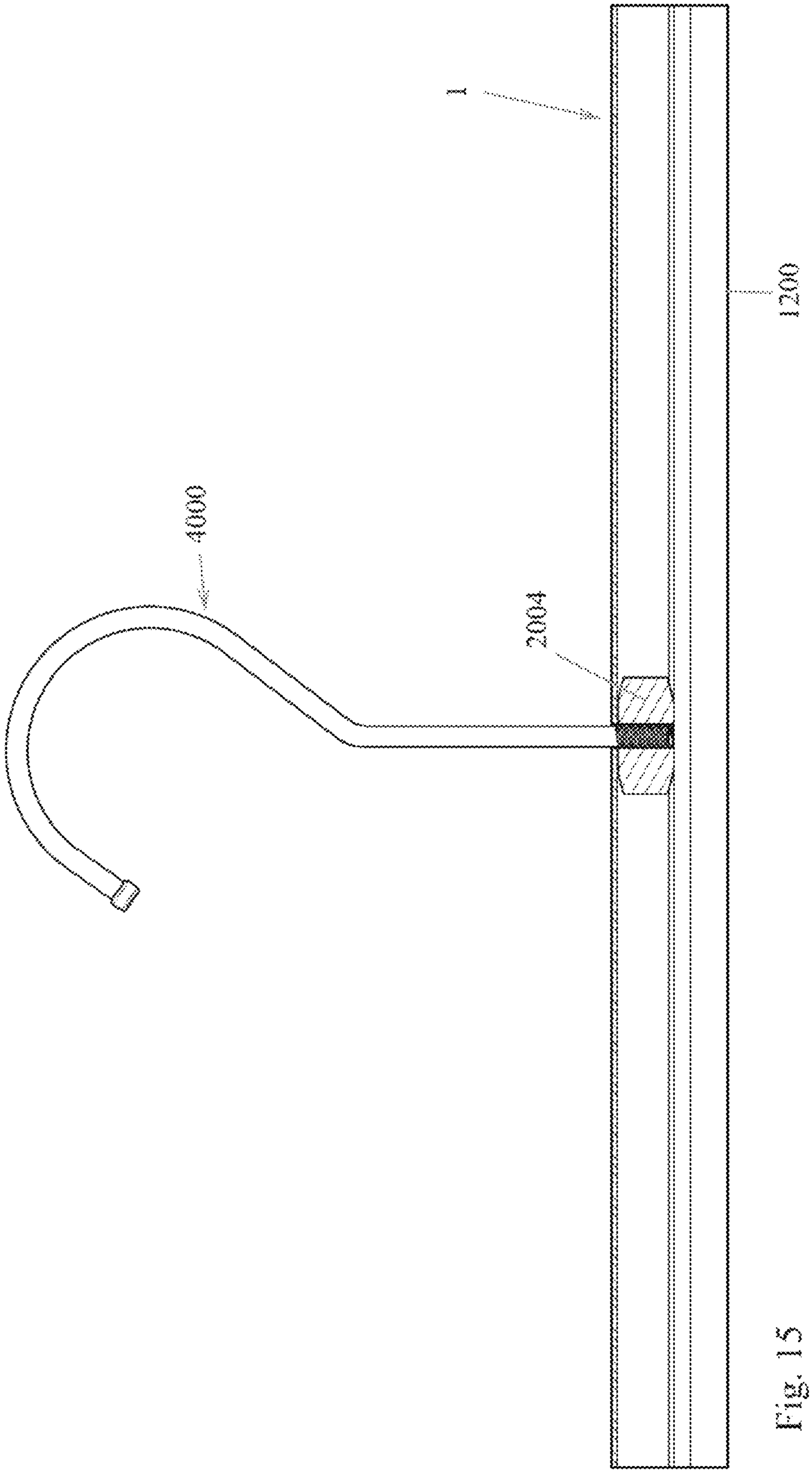

In the embodiment illustrated in FIGS. 14 and 15, a hook 4000 of the hanger is of the so-called classical type, i.e. substantially filiform, generally made of metallic material and having a first straight portion 4001 rising from the tubular element 1, which continues with a curved portion 4002. Advantageously, at the end of the straight portion 4001, the hook 4000 has a threaded portion 4003 adapted to be inserted in a second hole 2003 present on the upper part of the tubular element 1 opposite to the one in which the flat element 1200 is present.

FIG. 14 also shows a plug 2004 adapted to be inserted within the tubular element 1, so as to be partially arranged at its central portion. On the lateral surface of said plug 2004 a first hole 2005 is present which has to be positioned exactly at the second hole 2003 present on the surface of the tubular element 1. In this way, the threaded portion 4003 of the hook 4000 can be inserted into the first hole 2005, naturally passing through the second hole 2003 present in the tubular element 1.

FIG. 15 shows an overall sectioned view of the tubular element 1 to which the hook 4000 has already been applied, by screwing, which engages in the plug 2004 as already specified above, said plug 2004 having a knurled or corrugated outer surface to avoid rotations of the aforesaid plug, especially during the step of its insertion inside the tubular element 1, in order to facilitate the perfect overlapping of the holes 2003 and 2005.

However, once the plug 2004 and hook 4000 are in place, the overall situation of the hanger is illustrated in FIG. 15.

Advantageously, the plug 2004 will be made of compostable material and compatible with the process of recycling paper and similar materials.

Figure 16:
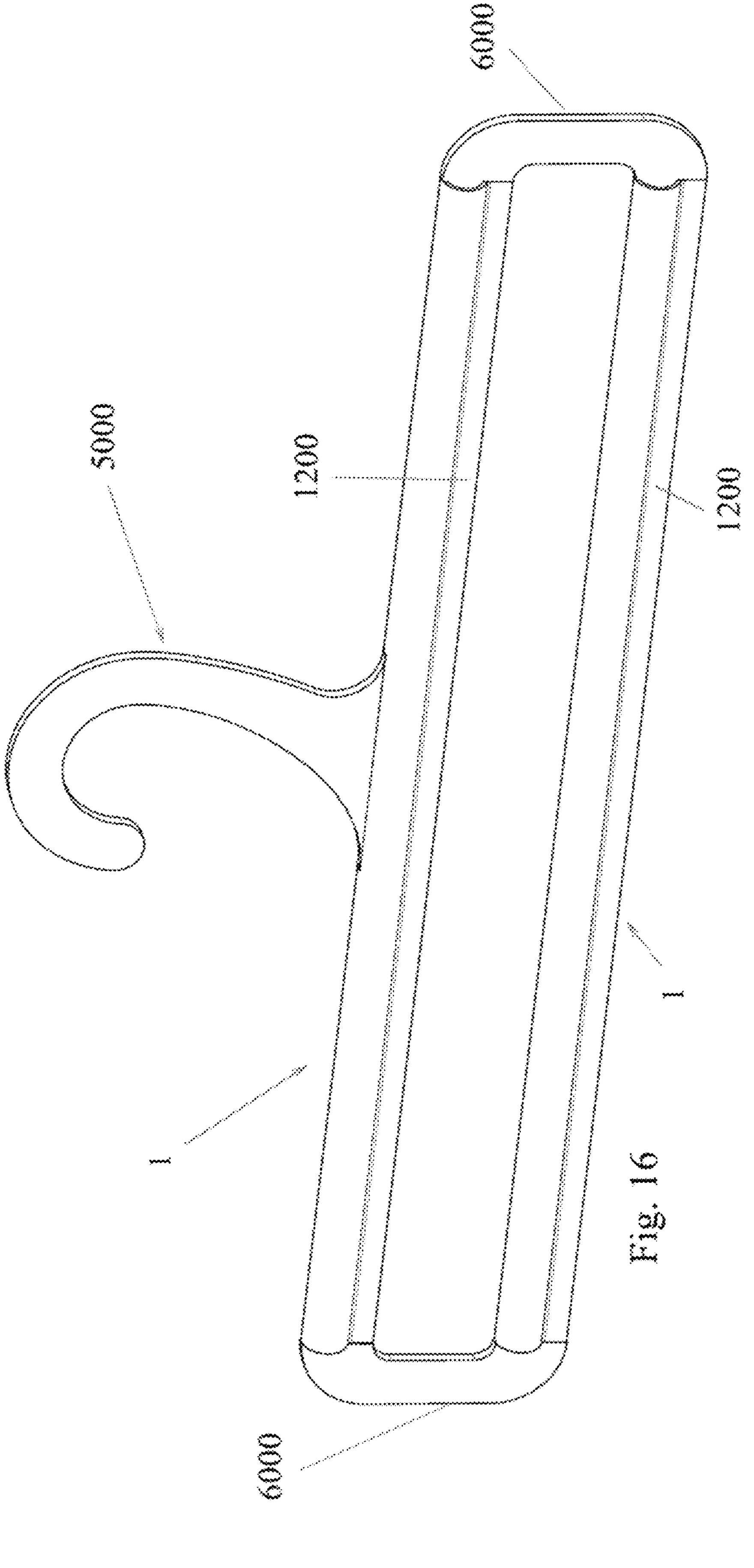
FIGS. 16-19 show hangers with two mutually parallel elements connected by two C-shaped elements, in which the garments am placed astride the lower element and in which tubular elements according to the invention are used, with hooks of different types.
Figure 17:
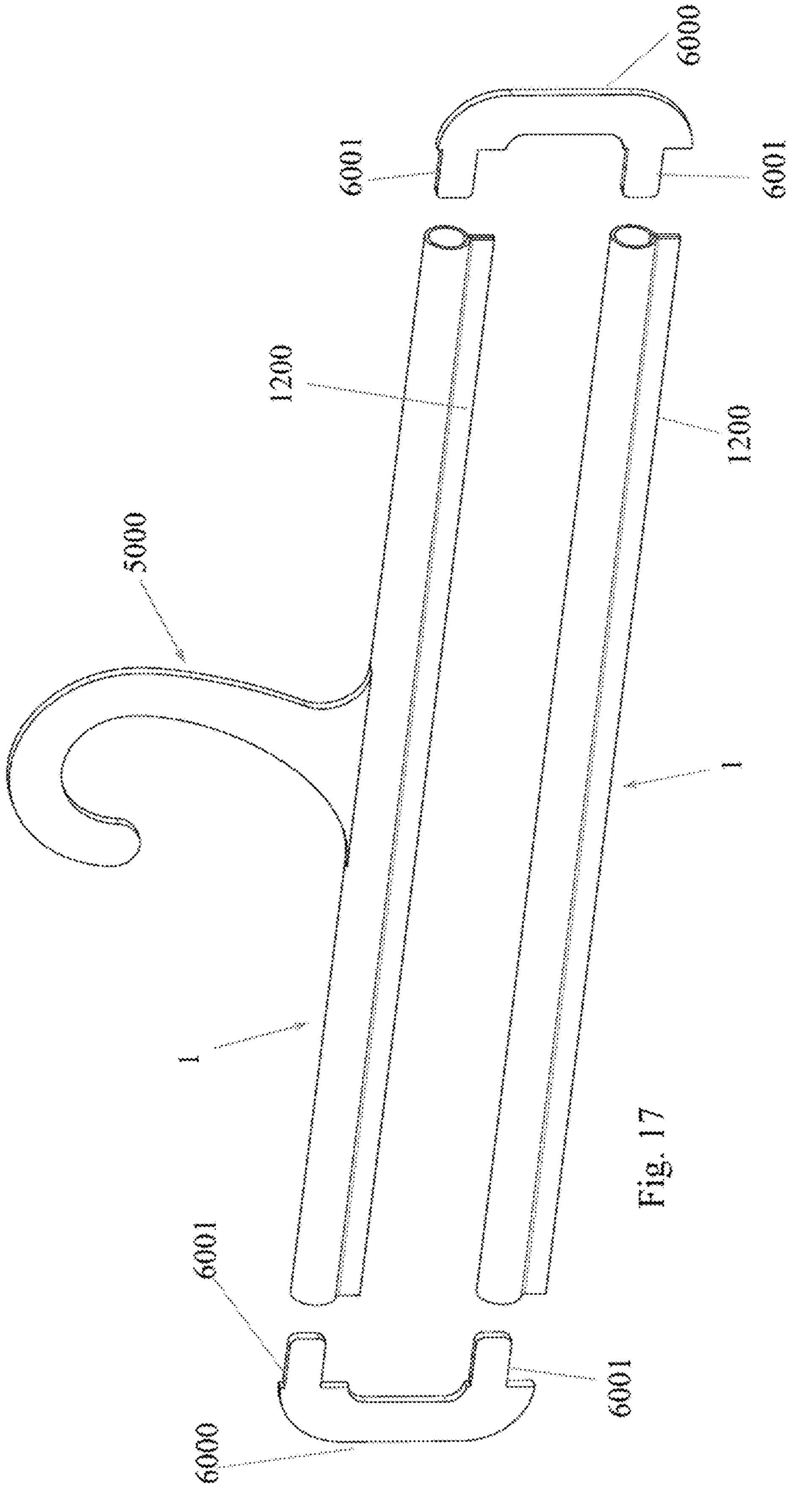
Figure 18:
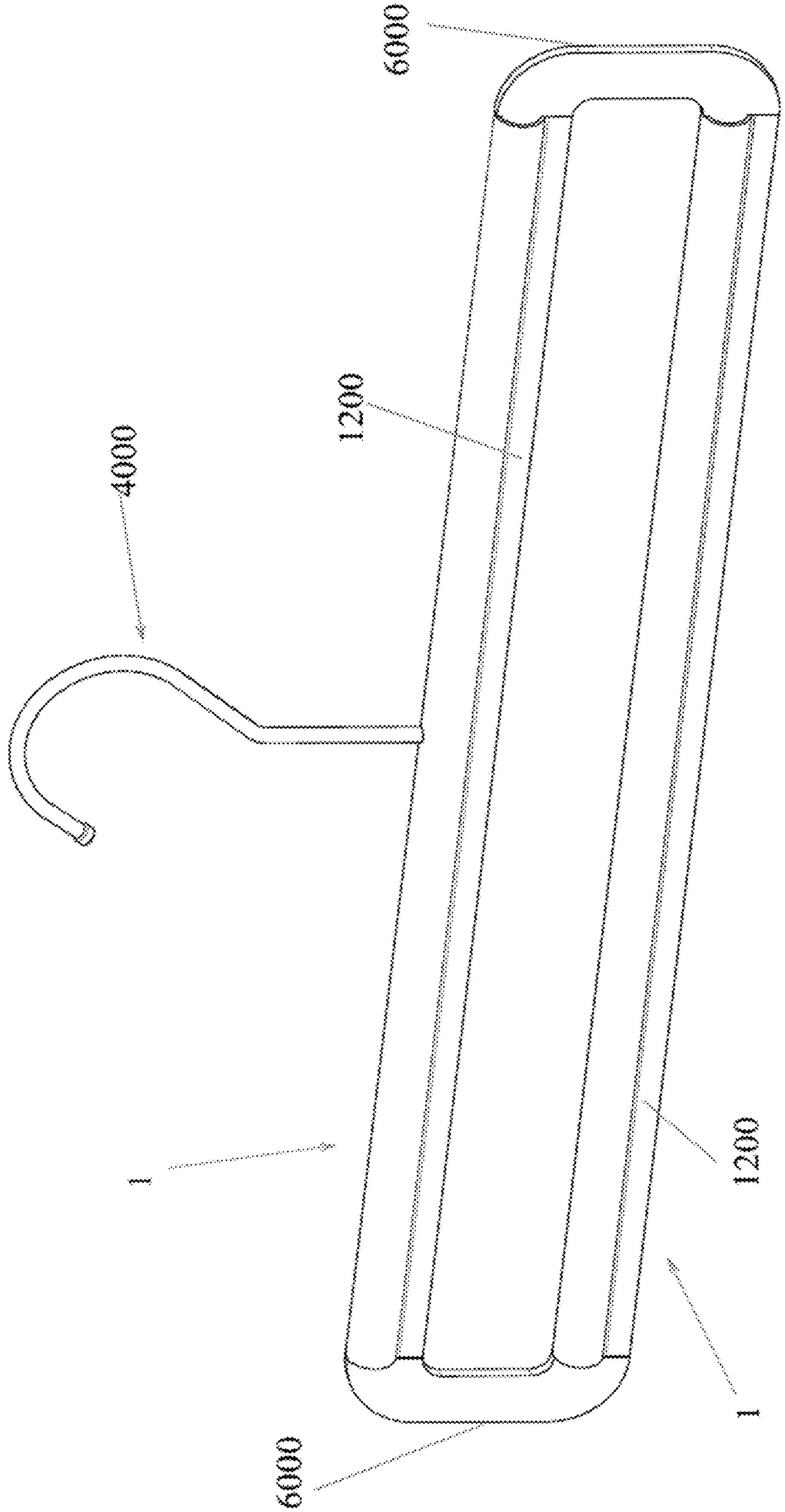
Figure 19:
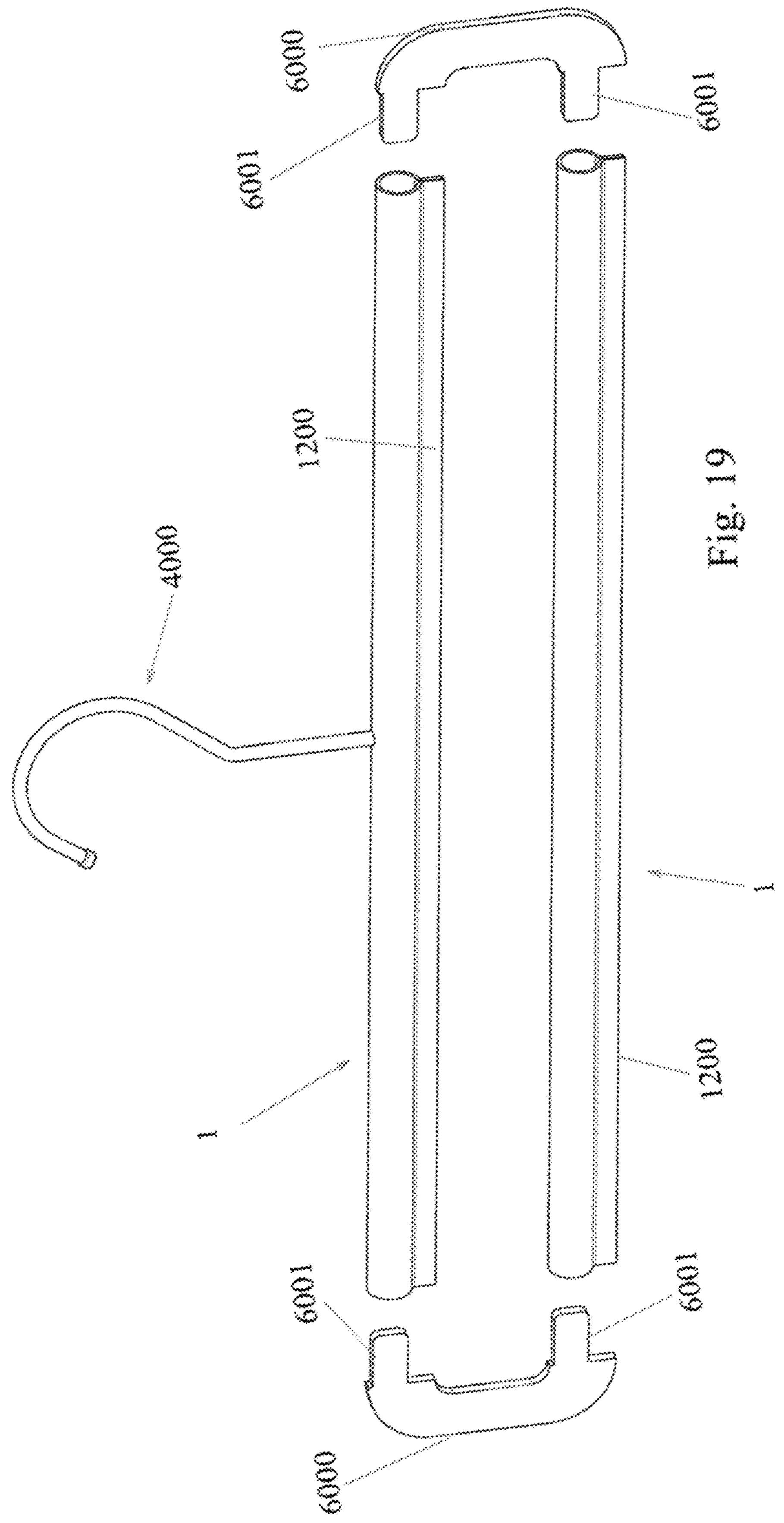

FIGS. 16 to 19 illustrate two embodiments of a hanger of the type that, with a per se known conformation, has a pair of mutually parallel elements and connected by a pair of two C-shaped elements placed at the ends of said elements. In particular, the first embodiment is illustrated in FIGS. 16 and 17, while the second embodiment is illustrated in FIGS. 18 and 19. Both these embodiments use at least one tubular element 1, but advantageously two tubular elements 2 as constituents of the pair of mutually parallel elements; therefore, such elements 1 provide for the presence of the flat element 1200.

Advantageously, the hooks 4000 and 5000 will be provided at the tubular element arranged above, according to the types previously described in detail.

In these figures it is seen that in both embodiments of such a hanger, two substantially C-shaped elements 6000 are usable as connecting means between the tubular elements 1, the horizontal sections 6001 of which are inserted within the hollow body of these tubular elements. These C-shaped elements 6000 are advantageously made of cellulose or paper material, precisely in order to be able to recycle as much of the material that constitutes these hangers as possible.

From the above it can be seen, therefore, that by using the tubular element and the process according to the invention it is possible to solve in a simple way the problem that consists in being able to use a tubular element made of cellulose or paper material as a structural element for hangers.

Obviously, the technical design details and the components used, known in the state of the at and in evolution, can be the most varied, provided that all fall within the inventive concept defined by the following claims.

The invention claimed is:

1. A TUBULAR ELEMENT ASSEMBLY COMPRISING A TUBULAR ELEMENT OF CELLULOSE OR PAPER MATERIAL FOR MAKING HANGERS, having a cylindrical conformation, with a cross section perpendicular to its longitudinal axis of a substantially circular shape, from the surface of which a flat element integral with the tubular element and extending over the entire longitudinal length of said tubular element is radially projected outwardly, said tubular element being characterized in that at its surface opposite to that in which the flat element is present at least one opening constituted by a hole or by a slit within which a hook is insertable, and being further characterized in that, at the end of the tubular element, rods insertable in corresponding holes present on the surface of the tubular element opposite to the surface in which the flat element is present, at the end of said tubular element, said rods being adapted to prevent the outward disengagement of clamps hooked to said tubular element and adapted to hold garments.

2. THE TUBULAR ELEMENT ASSEMBLY, according to claim 1, wherein the hook has a flat shape, and is made of cellulose or paper material, which has a shank insertable into a slit provided at the surface opposite to the tubular element to that in which the flat element is present.

3. THE TUBULAR ELEMENT ASSEMBLY, according to claim 2, wherein the shank of the hook is shaped to insert with a snap into the slit so as to allow the stable positioning of the shank and thus of the entire hook with respect to the slit and therefore with respect to the entire tubular element.

4. THE TUBULAR ELEMENT ASSEMBLY, according to claim 3, wherein the shank has, at a first end thereof, a recess due to the presence of which a step is formed above the end and which connects said end with said recess, it being further provided that, at the opposite end of the shank, a concavity is present, delimited at the top by a nose, and at the end of the positioning of the hook with respect to the tubular element, the upper portion of the nose is mountable against the internal surface of said tubular element, while the upper surface of the step is mountable against the internal surface of the tubular element placed near the end opposite to the previous one of the slit.

5. THE TUBULAR ELEMENT ASSEMBLY, according to claim 1, wherein the hook is a substantially filiform hook, advantageously made of metallic material and with a first straight portion rising from the tubular element and continuing with a curved portion, where the hook has, at the terminal end of the straight portion, a threaded portion, adapted to be inserted in a suitable second hole present on the upper part of the tubular element opposite to the one in which the flat element is present, within the tubular element, a plug being inserted, and made of compostable material and compatible with a recycling process of paper and similar materials, on the lateral surface of said plug, a first hole being present, to be placed exactly at the second hole, present on the surface of the tubular element, thus allowing the insertion of the threaded portion of the hook into the first hole, passing through said second hole.

6. THE TUBULAR ELEMENT ASSEMBLY, according to claim 5, wherein the plug has a knurled or corrugated outer surface.

* * * * *